Jan. 30, 1923.

F. A. ARIENS ET AL.
ANIMAL TRAP.
FILED MAR. 15, 1922.

1,443,334

INVENTORS.
F. A. Ariens,
W. A. Wagner,
BY Milton S. Crandall
ATTORNEYS.

Patented Jan. 30, 1923.

1,443,334

UNITED STATES PATENT OFFICE.

FRANK A. ARIENS AND WALTER A. WAGNER, OF SIOUX CITY, IOWA.

ANIMAL TRAP.

Application filed March 15, 1922. Serial No. 544,009.

*To all whom it may concern:*

Be it known that we, FRANK A. ARIENS and WALTER A. WAGNER, citizens of the United States, and residents of Sioux City, in the county of Woodbury and State of Iowa, have invented certain new and useful Improvements in Animal Traps, of which the following is a specification.

Our invention contemplates an improved animal trap of the type having a tilting platform which precipitates the animal therebelow.

Another object of the invention is the production of an improved animal trap inexpensive in production yet durable and thoroughly efficient in operation.

The invention will be clearly understood from the following description, reference being had to the accompanying drawings which form a part of this application and in which like characters of reference indicate corresponding parts in both views, of which,—

Figure 1:
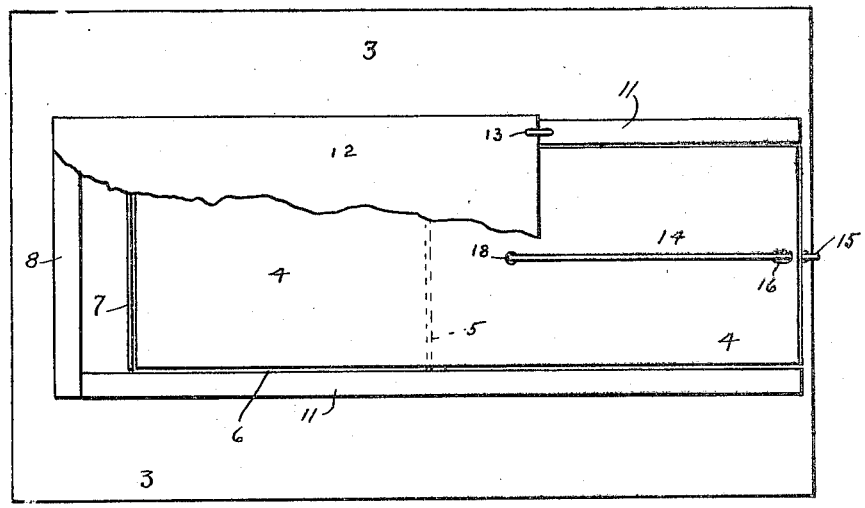
Figure 2:
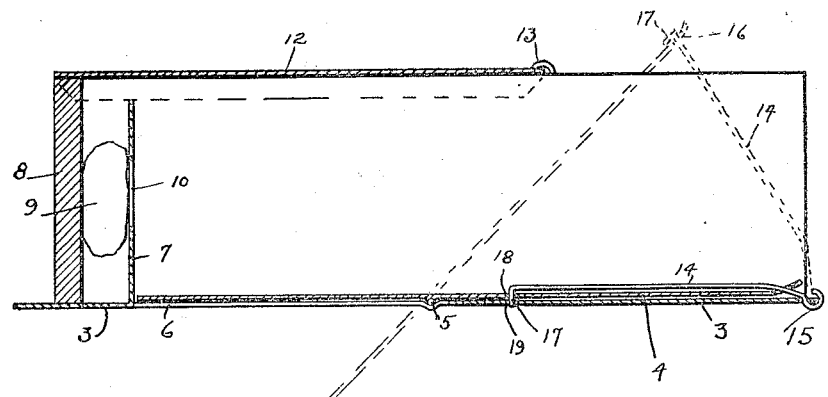

Fig. 1 is a plan of a trap constructed in accordance with our invention, a portion being cut away, and Fig. 2 is a longitudinal, vertical section of the same.

Our device includes, essentially, a suitable base-plate, 3, preferably of sheet metal. A tilting platform, 4, is provided, suitably pivoted, as at 5, to the base, 3. The base is provided with an opening, 6, below the portion of the platform at one side of the pivot, 5, to permit the platform to be tilted as indicated in dotted lines. This opening, 6, is preferably provided by shearing a rectangular portion, 7, from the plate, 3, and bending such portion, 7, upwardly adjacent the end of the platform, between which and an end wall, 8, or other suitable upright part secured to the base, 3, may be interposed the bait, 9, which is exposed through a suitable opening, 10, in the part, 7. The trap may be provided with side walls, 11, and a suitable cover, 12, hinged, as at 13, to the side walls to swing upwardly to afford access to the bait retainer. At the entrance end of the trap we provide improved means for preventing the tilting of the platform beyond a determinate point and also serving to drive the animal onto the downwardly tilting portion of the platform when it has partially entered thereupon. This means comprises a wire, 14, pivoted at the entrance end of the trap, as at 15, to the base, 3. The said wire projects through an opening, 16, in the adjacent end of the platform, 4; and normally rests adjacent the upper side of the platform. The free end portion of the wire, 14, is bent at an angle, as at 17, and normally projects into openings, 18 and 19, in the platform and base, respectively.

It will now be evident that animals entering the trap, attracted by the bait, 9, will tilt the platform to position shown in dotted lines and thereby be precipitated below the platform. Obviously, the base, 3, is intended to be supported on a receptacle suitable to receive the animals when thus precipitated. As the animal passes the pivotal point, 5, upon the platform, it is evident the free end of the wire, 14, will swing upwardly with the slightest tilting movement of the platform. This upward movement of the wire, 14, so frightens the animal that it will not run from the trap, but rather run toward the closed end thereof, thus insuring that it will be dropped through the platform.

Having thus described our invention, what we claim as new and desire to secure by Letters Patent of the United States, is:

1. An animal trap embodying a base member, a platform pivoted intermediately thereon to tilt vertically, a wire pivoted on the base, the upwardly tilting end of the platform having an opening, and the wire being extended therethrough to normally lay adjacent the upper side of the platform, and a stop on the free end of the wire to limit the tilting of the platform.

2. An animal trap embodying a base member, a platform pivoted intermediately thereon to tilt vertically, a wire pivoted on the base, the upwardly tilting end of the platform having an opening, and the wire being extended therethrough to normally lay adjacent the upper side of the platform, the free end portion of the wire being bent at an angle to engage and limit tilting of the platform and the platform and base being provided with normally registering openings to receive the bent end portion of the wire.

3. An animal trap embodying an enclosure passage having an open end, and including a base, a platform pivoted intermediately in the passage to tilt vertically, and a wire pivoted on the adjacent said open end, the platform having an opening through which the wire extends, the wire being provided with a stop to engage and limit tilting of the platform.

In testimony whereof, we have hereunto set our hands this 28th day of February, 1922.

FRANK A. ARIENS.
WALTER A. WAGNER.